Nov. 9, 1954     E. H. TOVEE ET AL     2,694,020
METAL MEMBERS PROVIDED WITH STABILIZED ALKALI METAL SILICATE
INSULATION AND PROCESS FOR PRODUCING THE SAME
Filed Oct. 20, 1950

Coating Comprising Alkali Metal Silicate
and Urea–Aldehyde Reaction Product

WITNESSES
Robert C. Baird
Leon J. Vaza

INVENTORS
Edward H. Tovee &
Edward G. Ford.
BY
Frederick Shape
ATTORNEY

United States Patent Office 2,694,020
Patented Nov. 9, 1954

2,694,020

METAL MEMBERS PROVIDED WITH STABILIZED ALKALI METAL SILICATE INSULATION AND PROCESS FOR PRODUCING THE SAME

Edward Harold Tovee and Edward Graham Ford, Hamilton, Ontario, Canada, assignors, by mesne assignments, to Canadian Westinghouse Company, Limited, Hamilton, Ontario, Canada, a company of Canada Application October 20, 1950, Serial No. 191,314

6 Claims. (Cl. 117—132)

This invention relates to stabilized alkali metal silicate coatings on metallic members such as electrical steel laminations and the process for producing such products.

In the electrical industry, metallic members such as laminations for the magnetic cores of transformers, generators, motors, and the like, have been treated with alkali metal silicate, and particularly sodium silicate, in aqueous solution to provide a thin coating of the solution which when heated and dried results in an insulating coating. It is highly important that this insulating coating retain its good electrically insulating properties throughout the life of such machines. However disadvantages have been encountered in the use of the alkali metal silicate coatings. One defect that appears is the breakdown of the alkali metal silicate when exposed to humid atmospheres. At high humidities, the alkali metal silicate picks up moisture and carbon dioxide from the atmosphere, the insulating film then breaks down, and in the presence of moisture rusting of the magnetic laminations occurs. Also, the coatings sometimes effloresce to produce an unsightly white deposit on the surfaces of the laminations and members produced therewith. In some cases, the applied silicate coatings have been washed away by reason of exposure to water for short periods of time so that no coating is present on the laminations.

The object of this invention is to provide a stable coating of an alkali metal silicate in combination with predetermined proportions of the reaction product of a urea compound and an aldehyde coating will retain its electrical properties and which form a homogeneous protective film for a much longer period than the unmodified silicates.

A further object of the invention is to provide on a magnetic lamination an adherent stable film comprising the combination of an alkali metal silicate and a reaction product of a urea compound and an aldehyde.

Another object of the invention is to provide a process for applying to metallic members alkali metal silicate composition combined with a stabilizing reaction product of a urea compound and an aldehyde.

Other objects of the invention will in part be obvious and will in part appear hereinafter.

For a better understanding of the nature and objects of the invention, reference should be had to the following detailed description and drawing, in which.

Figure 1:
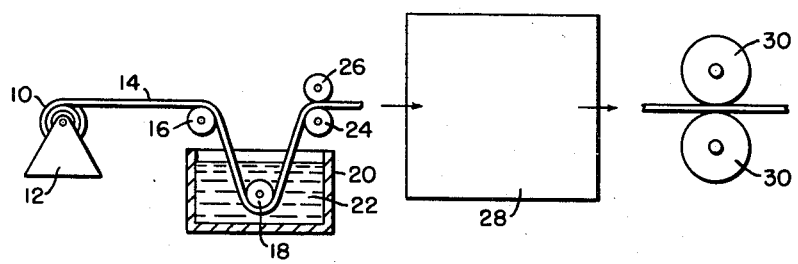
Figure 1 is a schematic view of an apparatus for coating magnetic sheets.

It has been discovered that coatings of alkali metal silicates on metal laminations may be stabilized and rendered substantially more protective for prolonged periods of time even when in contact with highly humid atmospheres, by incorporating in the coating from 1 to 20 parts by weight of the reaction product of a urea compound and an aldehyde, for each 100 parts of the alkali metal silicate.

In the practice of the invention, the alkali metal silicates are preferably those having a mole ratio of alkali metal oxide to silica of 1:1 to 1:3.9, though these proportions given may be departed from slightly. Alkali metal silicates in which the moles of alkali metal oxide exceed the moles of silica are generally too water soluble, highly caustic and too reactive to be useful when exposed to the wide variety of atmosphere conditions normally to be expected. Good results may be obtained by using sodium silicates having a sodium oxide to silica ratio of, for example, 1:3.22, 1:2.0, and 1:3.9. Sodium silicate or potassium silicate or mixtures of both may be used.

In accordance with this invention, we prepare an admixture of the alkali metal silicate in aqueous solution and the reaction products of a urea compound and an aldehyde. The reaction products of the urea compound and the aldehyde should be water soluble or water miscible. The reaction products may be produced by simply admixing the urea compound and the aldehyde and heating the mixture for a short period of time, heating being terminated before water insoluble products are produced. These reaction products may be simple compounds such as dimethylol urea, or semi-resinous products which, however, are water soluble. Examples of suitable urea compounds to be reacted are urea, thiourea, cyanamide, biuret, dicyandiamide, guanidine, melamine and substituted melamines, as well as substituted ureas and thioureas, reactable with an aldehyde. Mixtures of two or more of these urea compounds may be employed. The urea compounds have the characteristic that they contain at least one carbon atom bonded to two nitrogen atoms of which at least one nitrogen atom is amino nitrogen. Aldehydes suitable for reaction with the urea compound are formaldehyde, paraformaldehyde, furfural, acetaldehyde, and butaldehyde and mixtures of two or more.

We prefer to use dimethylol urea because of its solubility in water and alkaline aqueous solutions and other properties. Dimethylol urea may be produced by mixing two moles of 40% aqueous formaldehyde with one mole of urea and heating at 100° C. for 15 minutes in the presence of barium hydroxide. However, dimethylol urea is available on the market.

In practicing the invention, there is prepared an aqueous solution containing 100 parts by weight of the alkali metal silicate and admixed therein from 1 to 20 parts of the water-soluble reaction product of the urea compound and the aldehyde, sufficient water being present to provide a solution of a specific gravity of from 1.1 to 1.3. Several procedures may be followed in preparing these admixtures. In one case, the reaction product of a urea compound and an aldehyde such, for example, as dimethylol urea is dissolved in hot water and this solution which may contain part of the dimethyl urea as a colloidal suspension, is added to an aqueous solution of the alkali metal silicate in the required proportions. When the two solutions have been thoroughly admixed, the resulting composition is ready for use.

Another procedure is to stir the dimethylol urea into warm aqueous sodium silicate solution, at 60° C. to 90° C., for example, by sifting the dimethylol urea in small portions. The resulting composition may be applied to metallic members, such as ferrous metal laminations by dipping, spraying, roller coating, brushing, etc. After having been applied to the metallic member, preferably in the form of a thin coating, the members with the applied aqueous coating are heat treated. The heat treatment should be at a temperature and for a period of time sufficient to drive off the water from the coating without, however, completely decomposing the urea-aldehyde reaction product. A temperature of 120° C. may be applied for up to 30 minutes while a temperature of 350° C. need be applied for only a few minutes to drive off the moisture and to produce an adherent stable alkali metal silicate coating having intimately admixed therein the urea-aldehyde reaction product.

Referring to Fig. 1 of the drawing, there is illustrated apparatus for coating magnetic sheets. In the apparatus a coil 10 of magnetic sheet material mounted on a stand 12 is unrolled so that the magnetic sheet 14 passes over a roller 16 and under a roller 18 mounted within a tank 20 so as to be submerged in the aqueous composition 22 comprising the alkali metal silicate and urea-aldehyde reaction product. The sheet 14 in passing through the aqueous composition 22 picks up a layer thereof on both surfaces thereof, and then passes between suitable adjusted squeeze rolls 24 and 26 to remove an excess above a predetermined thickness thereon. The coated sheet 14 then passes into an oven 28 in which the applied coating is dried at suitable temperatures and is withdrawn from the oven under the drawing action of rolls 30.

Figure 2:
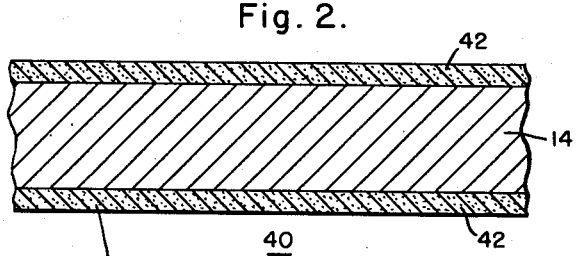
Fig. 2 is a fragmentary enlarged cross section through a coated sheet.

As illustrated in Fig. 2 of the drawing, the resulting insulated sheet 40 in which the upper and lower surfaces of sheet 14, after passing through the apparatus of Fig. 1, carry a dry adherent coating 42 comprising the heat treated mixture of alkali metal silicate and the urea-aldehyde reaction product. It will be understood that individual punched or cut laminations may be dipped in the composition and then passed through an oven to produce the desired insulated laminations.

During heat-treatment the urea-aldehyde reaction product will ordinarily become heat hardened and is no longer substantially soluble in water. The reaction product stabilizes the alkali metal silicate against ready solubility in reaction with water or decomposition when exposed to highly humid atmospheres.

The following example illustrates the practice of the invention:

*Example*

One hundred pounds of sodium silicate having a mole ratio of sodium oxide to silica of 1:3.9 was dissolved in water to produce a solution having a specific gravity of approximately 1.3. Five pounds of dimethylol urea was mixed in 10 pounds of hot water (80° C.) and the resulting suspension and solution was added to the sodium silicate solution. The two solutions were thoroughly admixed and were found to blend well. Ferrous metal laminations were passed through the resulting aqueous solution, whereby they were coated with less than a one-half mil thick coating of the solution. The laminations coated with the solution were passed into an oven maintained at a temperature of 120° C. for 15 minutes. Thin adherent films of stabilized alkali metal silicate were formed on the laminations by this treatment. A group of laminations were tested for resistance and the average value of resistance was approximately 16,000,000 ohms per square centimeter per lamination. Similar laminations treated in a similar sodium silicate solution without the dimethylol-urea additive had an average resistance of 11,600,000 ohms per square centimeter per lamination.

The laminations with the films of the present invention were tested by immersing them with highly refined petroleum oils at a temperature of 130° F. for 96 hours. No reaction or any significant change in the films or in the oil were noted in this test. In another group of tests, the laminations with the stabilized sodium silicate coatings in this example were exposed to atmospheres of 40% humidity, 60% humidity and 80% humidity, respectively. After six weeks exposure to the atmospheres, no significant changes were noted in the coatings produced in accordance with the present invention, whereas after two weeks, coatings comprising only sodium silicate began to crack and in five to six weeks had either turned white or flaked so badly that they were of no benefit. Even at 100% humidity test conditions, the coatings of the present invention were intact after one week testing, whereas the unstabilized sodium silicate coatings had been completely washed off.

If it is desired to improve the mechanical properties of the coatings, there may be added up to 10% of the weight of the alkali metal silicate of finely divided inorganic insulating materials such as talc, silica, mica, magnesia, and the like, in the form of a suspension. These inorganic materials should be at least fine enough to pass through a 200 mesh sieve, i. e. having 200 openings per lineal inch, and preferably to pass a 325 mesh sieve. The coatings will be somewhat thicker than those produced by the use of solutions without any solid suspension.

The aqueous compositions of the alkali metal silicate and the reaction product of a urea compound and an aldehyde may be applied to copper, steel, aluminum, brass, and other metals and alloys that may be employed in the electrical industry. Thus, an alloy composed of 50% nickel and 50% iron may be coated with the stabilized alkali metal solutions of the present invention.

Since certain changes in carrying out the above process, and certain modifications in the article which embody the invention may be made without departing from its scope, it is intended that all matter contained in the above description shall be interpreted as illustrative and not in a limiting sense.

We claim as our invention:

1. In the process of providing a stable insulating coating on a metallic member, the steps comprising preparing an aqueous solution having dissolved therein 100 parts by weight of a water soluble alkali silicate having a mole ratio of alkali metal oxide to silica of from about 1:1 to 1:3.9, from 1 to 20 parts by weight of a water-soluble reaction product of a urea compound and an aldehyde, and sufficient water to provide a solution of a specific gravity of from 1.1 to about 1.3, applying the aqueous solution to the metallic member to provide a thin film of the solution on the surface thereof, and heating the applied film to a temperature sufficient to drive off the water without completely decomposing the reaction product, thereby providing on the surface of the metallic member an adherent electrically insulating coating comprising an intimate admixture of the alkali metal silicate and the reaction product, the coating being stable and relatively protective against moisture and rusting.

2. The process of claim 1 wherein the urea compound is one selected from the group consisting of urea, thiourea, melamine, dicyandiamide and guanidine.

3. The process of claim 1 wherein the aqueous solution is prepared by dissolving the reaction product of the urea compound and the aldehyde in hot water and adding the resulting solution to an aqueous solution of the alkali metal silicate.

4. The process of claim 1 wherein the powdered reaction product of the urea compound and the aldehyde is admixed directly in a hot solution of the alkali metal silicate.

5. A metal lamination having a thin adherent electrically insulating coating comprising essentially a heat-treated admixture of 100 parts by weight of an alkali metal silicate having a mole ratio of alkali metal oxide to silica of 1:1 to 1:3.9, and from 1 to 20 parts by weight of the reaction product of a urea compound and an aldehyde.

6. A metal lamination having a thin adherent electrically insulating coating comprising essentially a heat-treated admixture of 100 parts by weight of an alkali metal silicate having a mole ratio of alkali metal oxide to silica of 1:1 to 1:3.9, and from 1 to 20 parts by weight of the reaction product of a urea compound and an aldehyde and up to 10% of the weight of the sodium silicate of a finely ground inorganic insulating material dispersed in the coating.

References Cited in the file of this patent

UNITED STATES PATENTS

| Number | Name | Date |
| --- | --- | --- |
| 1,982,179 | Scharschu | Nov. 27, 1934 |
| 2,452,793 | Robie | Nov. 2, 1948 |
| 2,517,261 | Veitch | Aug. 1, 1950 |